United States Patent
Rabipour et al.

[11] Patent Number: 6,011,846
[45] Date of Patent: Jan. 4, 2000

[54] METHODS AND APPARATUS FOR ECHO SUPPRESSION

[75] Inventors: Rafi Rabipour, Cote St. Luc, Canada; Dominic Ho, Columbia, Mo.; Majid Foodeei, Montreal; Madeleine Saikaly, Saint-Laurent, both of Canada

[73] Assignee: Nortel Networks Corporation, Montreal, Canada

[21] Appl. No.: 08/881,062

[22] Filed: Jun. 24, 1997

Related U.S. Application Data

[60] Provisional application No. 60/034,267, Dec. 19, 1996.

[51] Int. Cl.[7] .............................. H04B 3/20; H04B 7/015; G10L 9/00
[52] U.S. Cl. ........................ 379/406; 379/399; 704/219; 704/233
[58] Field of Search ............................ 379/406; 704/226, 704/223, 219, 228

[56] References Cited

U.S. PATENT DOCUMENTS

| | | | |
|---|---|---|---|
| 3,991,287 | 11/1976 | May, Jr. et al. | 179/170.2 |
| 5,646,991 | 7/1997 | Sih | 379/410 |
| 5,687,229 | 11/1997 | Sih | 379/410 |
| 5,893,056 | 4/1999 | Saikaly et al. | 704/226 |

FOREIGN PATENT DOCUMENTS

| | | | |
|---|---|---|---|
| 2 256 351 | 12/1992 | United Kingdom | H04B 3/20 |
| WO 96/34382 | 10/1996 | WIPO | G10L 3/00 |

*Primary Examiner*—Forester W. Isen
*Assistant Examiner*—Brian Tyrone Pendleton
*Attorney, Agent, or Firm*—C. W. Junkin

[57] ABSTRACT

In methods and apparatus for suppressing echo of a far end signal encoded using LPC-based compression in a near end signal encoded using LPC-based compression, parameters of each frame of the near end encoded signal are processed without synthesizing a speech signal from the near end encoded signal to determine whether sufficient echo to merit echo suppression is present in the frame. Upon determining that insufficient echo to merit echo suppression is present in the frame, the parameters of the frame are passed unmodified. Upon determining that sufficient echo to merit echo suppression is present in said frame, the parameters of the frame are modified without synthesizing a speech signal to suppress echo in the frame. The methods and apparatus are particularly suitable in codec bypass applications.

21 Claims, 6 Drawing Sheets

METHODS AND APPARATUS FOR ECHO SUPPRESSION

This application claims the benefit of U.S. Provisional Application Ser. No. 60/034,267 filed Dec. 19, 1996.

FIELD OF THE INVENTION

This invention relates to methods and apparatus for echo suppression in telecommunications systems, and is particularly applicable to suppression of echo in signals encoded using LPC-based compression.

BACKGROUND OF THE INVENTION

Echo is a common problem in telecommunications systems, and can be very annoying to users of telecommunications systems having relatively long transmission delays, as for example satellite telecommunications systems and cellular radio telecommunications systems. Consequently, several methods for suppressing echo have been developed.

In many radio telecommunications systems, available radio spectrum is limited. In such systems, low bit rate encoding of speech signals is used to reduce the bandwidth required for transmission of each speech signal and to increase the number of speech signals that can be transmitted over the available radio spectrum. LPC coding of speech signals is used in many such systems.

Known methods for suppression of echoes in signals encoded using LPC-based compression are generally performed at the encoder or decoder where the original speech signal or the synthesized speech signal is available for processing. This location for echo suppression functionality may not be convenient in some applications, particularly where LPC codecs in the network are bypassed (e.g. in mobile-to-mobile connections) to provide better end-to-end voice quality (see, for example, U.S. patent application Ser. No. 08/358,949 filed Dec. 19, 1994 in the names of Hermon Pon et al and entitled System for TDMA Mobile-to-Mobile VSELP Codec Bypass).

Accordingly, there is a need for echo suppression functionality that can be applied to LPC-encoded speech signals at locations other than the codecs without excessive degradation of end-to-end speech quality.

SUMMARY OF THE INVENTION

An object of this invention is to provide methods and apparatus for echo suppression that can be applied directly to signals encoded using LPC-based compression without requiring access to an original or synthesized speech signal.

One aspect of the invention provides a method for suppressing echo of a far end signal encoded using LPC-based compression in a near end signal encoded using LPC-based compression. The method comprises processing parameters of each frame of the near end encoded signal without synthesizing a speech signal from the near end encoded signal to determine whether sufficient echo to merit echo suppression is present in the frame. Upon determining that insufficient echo to merit echo suppression is present in the frame, the method comprises passing the parameters of the frame unmodified. Upon determining that sufficient echo to merit echo suppression is present in the frame, the method comprises modifying the parameters of the frame without synthesizing a speech signal to suppress echo in the frame.

The step of processing the parameters of each frame without synthesizing a speech signal from the near end encoded signal to determine whether sufficient echo to merit echo suppression is present in the frame may comprise determining a near end spectrum from the parameters of the frame of the near end encoded signal, determining a respective measure of correlation of the near end spectrum to each of a plurality of far end spectra, each far end spectrum corresponding to a respective frame of the far end signal, the respective frame of the far end signal having a respective time lag with respect to the frame of the near end encoded signal, comparing the measures of correlation to determine a maximum measure of correlation, and declaring sufficient echo to merit echo suppression to be detected in the frame of the near end encoded signal when the maximum measure of correlation exceeds a predefined value.

The step of modifying the parameters of the frame without synthesizing a speech signal to suppress echo in the frame may comprise modifying the parameters to replace the frame with a frame of encoded noise generated from the parameters.

The step of modifying the parameters to replace the frame with a frame of encoded noise generated from the parameters may comprise replacing LPC coefficients of the frame with respective averages of the LPC coefficients over a plurality of preceding frames, detecting whether speech is present in the frame and, upon detection of speech in the frame, randomizing excitation parameters of the frame.

The step of replacing LPC coefficients may comprise replacing LPC coefficients for the frame with respective averages calculated over the frame and a plurality of preceding frames for frames in which no speech is detected, and replacing LPC coefficients for the frame with respective averages of LPC coefficients used to replace LPC coefficients of an immediately previous frame for frames in which speech is detected.

Another aspect of the invention provides apparatus for suppressing echo of a far end signal encoded using LPC-based compression in a near end signal encoded using LPC-based compression. The apparatus comprises a processor and a storage medium for storing instructions for execution by the processor. The instructions comprise instructions for processing parameters of each frame of the near end encoded signal without synthesizing a speech signal from the near end encoded signal to determine whether sufficient echo to merit echo suppression is present in the frame, instructions for passing the parameters of the frame unmodified upon determining that insufficient echo to merit echo suppression is present in the frame, and instructions for modifying the parameters of the frame without synthesizing a speech signal to suppress echo in the frame upon determining that sufficient echo to merit echo suppression is present in the frame.

Yet another aspect of the invention comprises a storage medium storing processor-readable instructions for execution by a processor to suppress echo of a far end signal encoded using LPC-based compression in a near end signal encoded using LPC-based compression. The instructions comprise instructions for processing parameters of each frame of the near end encoded signal without synthesizing a speech signal from said near end encoded signal to determine whether sufficient echo to merit echo suppression is present in said frame, instructions for passing the parameters of said frame unmodified upon determining that insufficient echo to merit echo suppression is present in said frame, and instructions for modifying the parameters of said frame without synthesizing a speech signal to suppress echo in said frame upon determining that sufficient echo to merit echo suppression is present in said frame.

Because the method and apparatus for suppressing echo in a near end signal encoded using LPC-based compression as defined above operate directly on the encoded signal without requiring access to either the original speech signal for a speech signal synthesized from the encoded signal, they can be applied at any point in the network at which the encoded bit streams are present. Moreover, because synthesis and recoding of the speech signal is not required, the echo suppression can be applied with less degradation of the end-to-end voice quality.

BRIEF DESCRIPTION OF DRAWINGS

Embodiments of the invention are described below, by way of example only. Reference is made to accompanying drawings, in which.

DETAILED DESCRIPTION OF EMBODIMENTS

Figure 1:
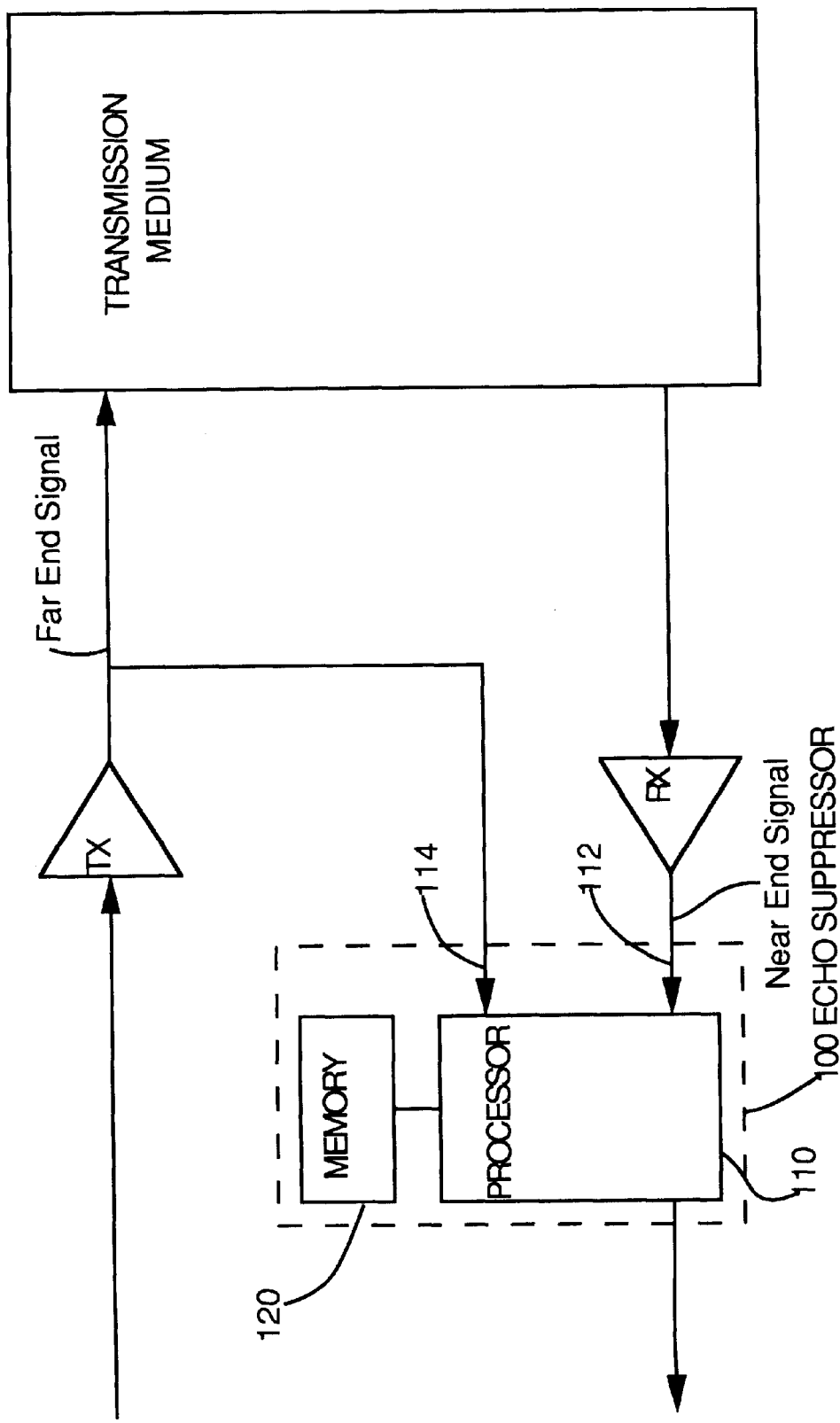
FIG. 1 is a block schematic diagram of a telecommunications system including an echo suppressor according to an embodiment of the invention.

FIG. 1 is a block schematic diagram of a telecommunications system including an echo suppressor 100 according to an embodiment of the invention.

The echo suppressor 100 comprises a processor 110 and a processor-readable storage medium in the form of a memory 120 which stores instructions for execution by the processor 110. The processor 110 has a near end signal input port 112 on which it receives an LPC-encoded near end signal, and a far end signal input port 114 on which it receives an LPC-encoded far end signal. The processor 110 executes instructions stored in the memory 120 to process the near end and far end signals so as to compute measures of echo of the far end signal in the near end signal as described below.

Figure 2A:
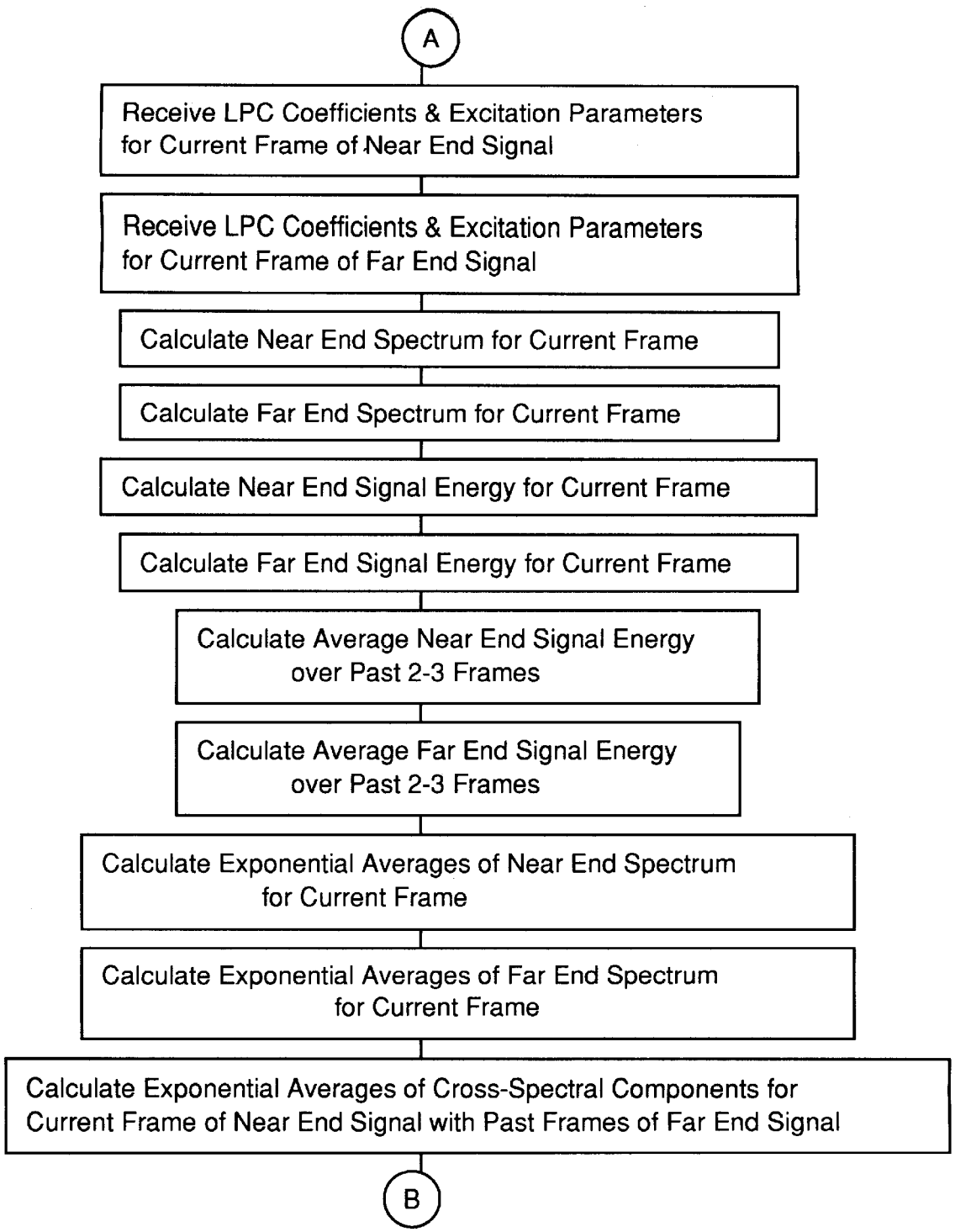
FIGS. 2A, 2B and 2C are flow charts showing steps in a method for echo detection and suppression according to an embodiment of the invention.
Figure 2B:
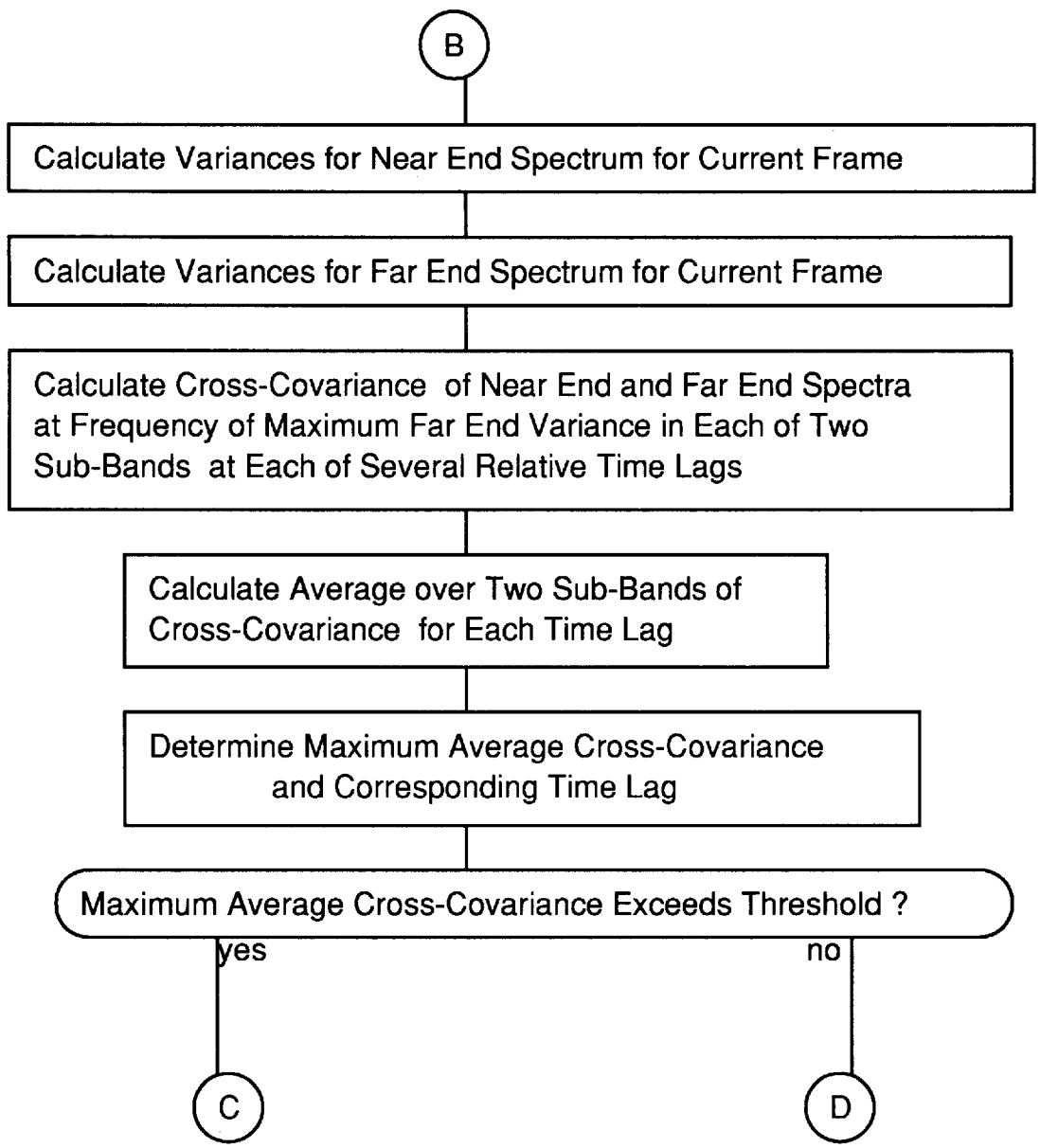
Figure 2C:
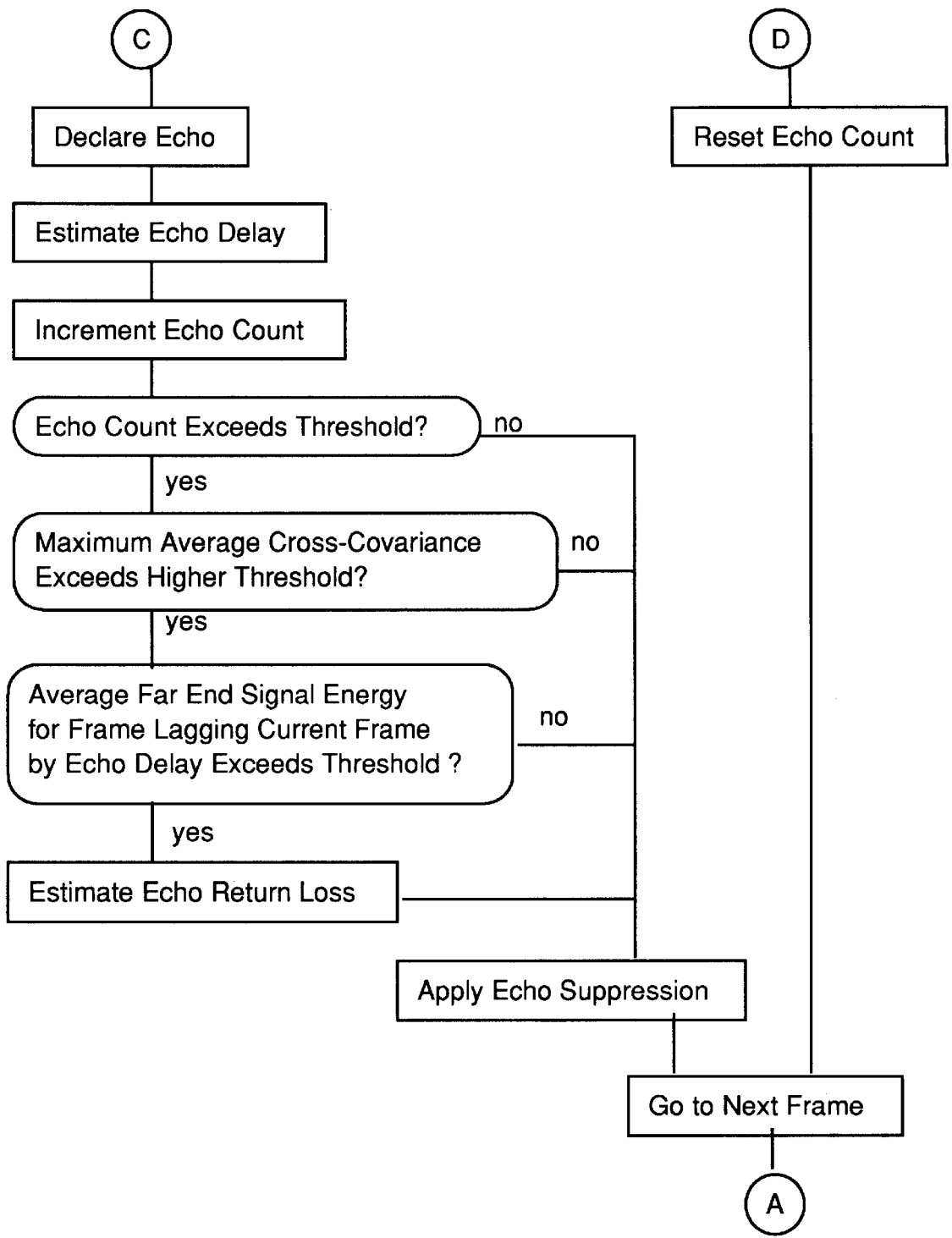

FIGS. 2A, 2B and 2C are flow charts showing steps performed by the processor 110 according to the instructions stored in the memory 120 to compute measures of echo of the far end signal in the near end signal.

For each successive 20 ms time interval, the processor 110 receives a frame of LPC-encoded information for the near end signal, and a frame of LPC-encoded information for the far end signal. The processor 110 executes stored instructions to derive a set of LPC coefficients and a set of excitation parameters from each frame of encoded information.

The processor 110 executes further stored instructions to calculate a near end spectrum, $S_N(f_i,k)$ for M values of $f_i$ between about 100 Hz and 2 kHz, for the frame corresponding to time k from the LPC coefficients and the excitation parameters for the frame of the near end signal corresponding to time k. Similarly, the processor 110 executes stored instructions to calculate a far end spectrum, $S_F(f_i,k)$ for M values of $f_i$ between about 100 Hz and 2 kHz, for the frame corresponding to time k from the LPC coefficients and the excitation parameters for the frame of the far end signal corresponding to time k. M is typically 8 to 12. The far end spectra for the past L 20 ms time intervals are stored in the memory for use in calculations described below. L is selected according to an expected value of echo delay. For example, if the expected echo delay is from 240 ms to 360 ms, L would be at least 18. (The methods used to derive spectra from LPC coefficients and excitation parameters depend on the specific LPC coding scheme used, and are well known to those skilled in the LPC coding art.)

The processor 110 also executes stored instructions to calculate a near end signal energy $R_N(k)$ from the LPC coefficients and the excitation parameters for the frame of the near end signal corresponding to time k, and a far end signal energy $R_F(k)$ from the LPC coefficients and the excitation parameters for the frame of the far end signal corresponding to time k. The near end signal energies are averaged over a predetermined number of frames, typically 2 or 3 frames. The far end signal energy values are also averaged over the predetermined number of frames, and the far end signal energy averages for the past L 20 ms time intervals are stored in the memory 120 for use in calculations described below. (The methods used to derive signal energies from LPC coefficients and excitation parameters depend on the specific LPC coding scheme used, and are well known to those skilled in the LPC coding art.)

The processor 110 executes stored instructions to calculate exponential averages of the near end and far end spectra according to the following equations:

$$\overline{S_F}(f_i,k)=\lambda_1 \times \overline{S_F}(f_i,k-1)+(1-\lambda_1)\times S_F(f_i,k) \text{ for } i=1 \text{ to } M \quad \text{Eq 1}$$

$$\overline{S_N}(f_i,k)=\lambda_1 \times \overline{S_N}(f_i,k-1)+(1-\lambda_1)\times S_N(f_i,k) \text{ for } i=1 \text{ to } M \quad \text{Eq 2}$$

$$\overline{S^2_F}(f_i,k)=\lambda_1 \times \overline{S^2_F}(f_i,k-1)+(1-\lambda_1)\times S^2_F(f_i,k) \text{ for } i=1 \text{ to } M \quad \text{Eq 3}$$

$$\overline{S^2_N}(f_i,k)=\lambda_1 \times \overline{S^2_N}(f_i,k-1)+(1-\lambda_1)\times S^2_N(f_i,k) \text{ for } i=1 \text{ to } M \quad \text{Eq 4}$$

$\lambda_1$ is typically 0.5.

An exponential average of cross-spectral components is also calculated according to the following equation:

$$\overline{S^2_{FN}}(f_i,k)_l = \lambda_1 \times \overline{S^2_{FN}}(f_i,k-1)_l + (1-\lambda_1) \times S_F(f_i,k-l) \times S_N(f_i,k) \text{ for } i=1 \text{ to } M$$
$$\text{and } l = L_0, L_0+1, \ldots, L \quad \text{Eq 5}$$

where l denotes a time lag, $L_0$ is a minimum expected echo path delay, and L is a maximum expected echo path delay, each of these quantities representing an integer number of 20 ms time intervals.

The processor 110 executes further stored instructions to calculate variances of the near end spectra and the far end spectra according to the following equations:

$$\text{var}(S_N(f_i,k)) = \overline{S^2_N}(f_i,k) - \overline{S_N}^2(f_i,k) \text{ for } i=1 \text{ to } M \quad \text{Eq 6}$$

$$\text{var}(S_F(f_i,k)) = \overline{S^2_F}(f_i,k) - \overline{S_F}^2(f_i,k) \text{ for } i=1 \text{ to } M$$
$$\text{(store from } k-L \text{ to } k\text{)} \quad \text{Eq 7}$$

The far end signal variances for the past L 20 ms time intervals are stored in the memory 120 for use in calculations described below.

The far end signal variances are divided into two groups. Group A contains the variances calculated for a sub-band of frequencies between 200 Hz and 920 Hz, a frequency range which generally contains a first formant frequency in a speech signal. The variances in Group A are compared, the maximum variance is determined and the frequency corresponding to the maximum variance is designated $f_A$. Group B contains the variances calculated for a sub-band of frequencies between 1160 Hz and 1800 Hz, a frequency range which generally contains a second formant frequency in a speech signal. The variances in Group B are compared, the maximum variance is determined and the frequency corresponding to the maximum variance is designated $f_B$.

The processor 110 executes further stored instructions to calculate a covariance at each of frequencies $f_A$ and $f_B$ for each time lag in the range between the minimum echo delay $L_0$ and the maximum echo delay L according to the following equation:

$$\rho_i^2(l,k) = \frac{\left(\overline{S_{FN}^2}(f_i,k)_l - \overline{S_F}(f_i,k-l)\cdot\overline{S_N}(f_i,k)\right)^2}{\text{var}(S_F(f_i,k-l))\cdot\text{var}(S_N(f_i,k))} \quad i=A,B \qquad \text{Eq 8}$$

The processor 110 executes further stored instructions to average the covariances at the two frequencies to derive an average covariance for each time lag between $L_0$ and L as follows:

$$\rho^2(l,k) = \frac{1}{2}\sum_{i=A,B}\rho_i^2(l,k) \quad l=L_0, L_0+1, \ldots, L \qquad \text{Eq 9}$$

The processor 110 then executes stored instructions to determine the maximum value of the average covariance:

$$p^2_{max}(k) = l^{max}(p^2(l,k)) = p^2(l^0,k) \qquad \text{Eq 10}$$

and the time lag $l^0$ corresponding to the maximum value of the average covariance. The maximum value of the average covariance is a measure of echo of the far end signal in the near end signal which may be used as described below.

The processor 110 executes further instructions to compare the maximum value of the average covariance to a predetermined value (typically about 0.1). If the maximum value of the average covariance exceeds the predetermined value, the processor 110 declares frame k of the near end signal to contain echo.

When frame k of the near end signal is declared to contain echo, the processor 110 executes further stored instructions to calculate an exponential average of the time lag $l^0$ corresponding to the maximum value of the average covariance according to the following equation:

$$D(k) = \lambda_2 \times D(k-1) + (1-\lambda_2) \times l^0(k) \qquad \text{Eq 11}$$

to estimate an echo delay $D(k) \times \lambda_2$ is typically about 0.9 to 0.95.

When frame k is declared to contain echo, the processor 110 also executes further stored instructions to count consecutive echo frames. If the maximum value of the average covariance exceeds a predetermined value (which may exceed the predetermined value used for declaring echo in the first instance to provide even greater certainty that echo is present), the number of consecutive echo frames exceeds a predefined minimum number (typically 2 or 3) and the average far end signal energy at the time interval lagging the present time interval by the echo delay exceeds a predetermined threshold, an echo return loss (ERL) is estimated from the average signal energies calculated above according to the following equation:

$$ERL(k) = \lambda_2 \cdot ERL(k-1) + (1-\lambda_2) \cdot \frac{\overline{R_N}(k)}{\overline{R_F}(k-l^0)} \qquad \text{Eq 12}$$

where $\overline{R_N}(k)$ and $\overline{R_F}(k-l^0)$ are the averages of the near and far end energies respectively.

Figure 3:
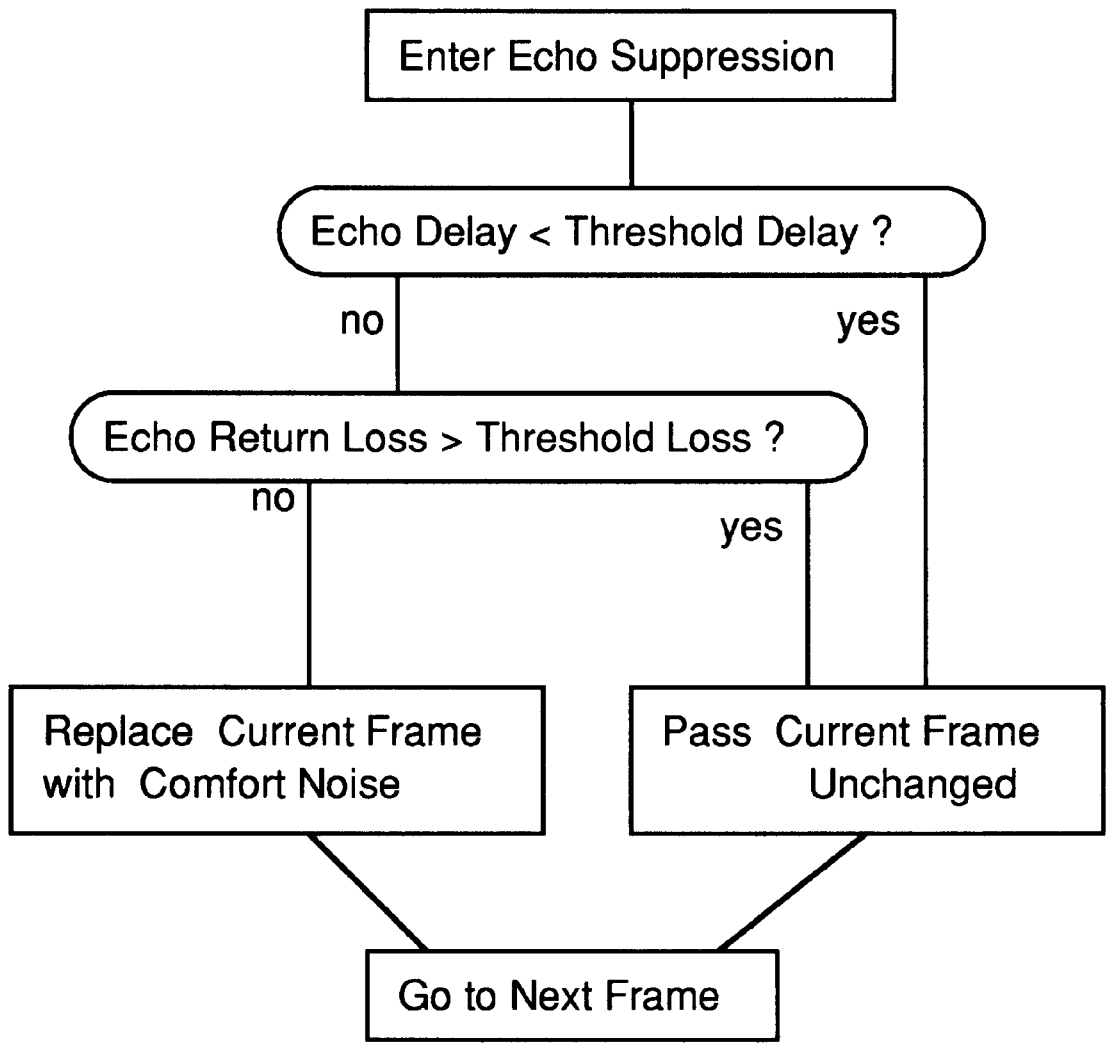
FIG. 3 is a flow chart showing an echo suppression step of FIG. 2C in greater detail.

The echo delay, $D(k)$, and the echo return loss, $ERL(k)$, are used in further operations of the processor 110 to determine the most effective echo suppression treatment as shown in FIG. 3. If the echo delay, $D(k)$, is less than a threshold delay, typically 10 msec, no echo suppression is applied. If the echo return loss, $ERL(k)$, is greater than a threshold loss, typically 45–50 dB for an echo delay greater than 50 msec, no echo suppression is applied. But if the echo delay, $D(k)$, exceeds the delay threshold, and the echo return loss, $ERL(k)$, is below the loss threshold, the processor 110 executes stored instructions to replace the signal for frame k with comfort noise. In a sophisticated implementation, the loss threshold may be a function of the echo delay, $D(k)$, for the current frame.

If the maximum value of the average covariance does not exceed the predetermined value, the processor 110 declares frame k of the near end signal to be echo-free, and takes no action to suppress echo in that frame of the near end signal, to calculate echo delay or to calculate echo return loss.

Figure 4:
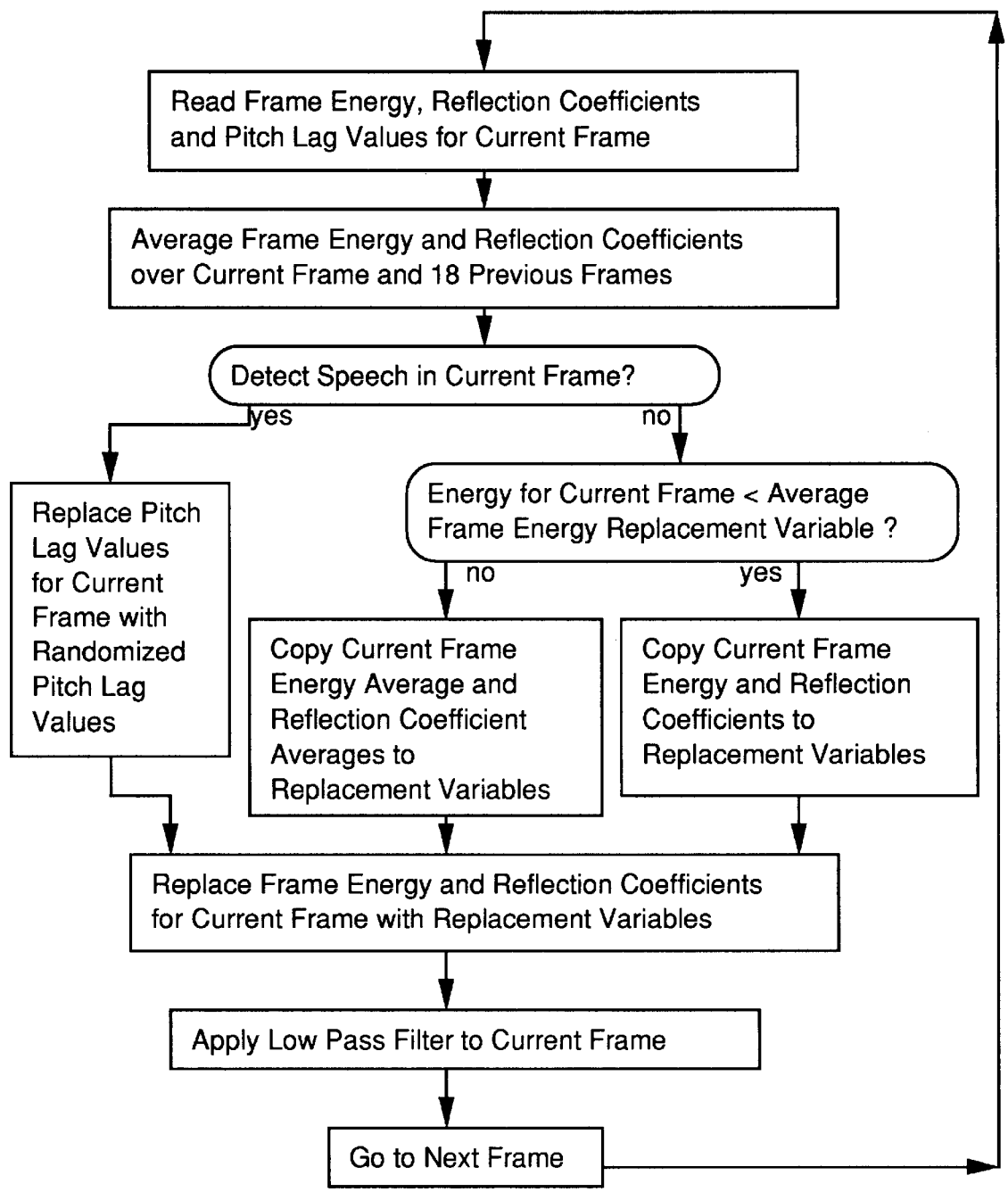
FIG. 4 is a flow chart showing a comfort noise generation step of FIG. 3 in greater detail.

FIG. 4 is a flow chart showing steps performed by the processor 110 according to the instructions stored in the memory 120 to generate the comfort noise signal.

For each successive 20 ms time interval (called a "frame"), the processor 110 receives a set of LPC coefficients, including 10 reflection coefficients, $k_1$ to $k_{10}$ and a frame energy value, $R_0$, and a set of excitation parameters including four pitch lag values, $lag_1$ to $lag_4$. The processor 110 executes stored instructions to average the frame energy, $R_0$, over the current frame and the previous 18 frames to compute an average frame energy, $R_0^{avg}$. Similarly, the processor 110 executes stored instructions to average each of the ten reflection coefficients, $k_i$, over the current frame and the previous 18 frames to compute ten average reflection coefficients, $k_i^{avg}$.

The processor 110 executes further stored instructions to determine whether the current frame of the LPC-encoded near end signal contains speech sounds. (A suitable set of instructions is described in U.S. patent application Ser. No. 08/431,224 entitled Methods and Apparatus for Distinguishing Speech Intervals from Noise Intervals in Speech Signals and filed in the names of C. C. Chu et al on Apr. 28, 1995 which is hereby incorporated in its entirety by reference).

If the processor 110 determines that the current frame of the LPC-encoded near end signal contains no speech sounds, the processor 110 executes further stored instructions to compare the frame energy for the current frame to an average frame energy, $R_0^{stable}$, calculated over a plurality of preceding frames. If the current frame energy is lower than $R_0^{stable}$, the processor 110 executes further stored instructions to copy the current frame energy and the current reflection coefficients to variables, $R_0^{stable}$ and $k_i^{stable}$. The excitation parameters including the four pitch lag values, $lag_i$, are left unchanged.

If the current frame energy is not lower than $R_0^{stable}$, the processor 110 executes further stored instructions to copy the average frame energy, $R_0^{avg}$, and the average reflection coefficients, $k_i^{avg}$, calculated for the current frame to the variables, $R_0^{stable}$ and $k_i^{stable}$, which are later used to replace the frame energy and reflection coefficients for the current frame, $R_0$ and $k_i$, after quantization. In this case, the excitation parameters including the four pitch lag values, $lag_i$, are left unchanged.

If the processor 110 determines that the current frame of the LPC-encoded near end signal contains speech sounds, the processor 110 executes further stored instructions to replace the four pitch lag values, $lag_i$, for the current frame with pitch lag values that are randomly selected from the values permitted for pitch lags in the VSELP coding technique (i.e. from 20 to 146). In this case, the values of the variables $R_0^{stable}$ and $k_i^{stable}$ are not updated.

The processor 110 executes further stored instructions to replace the frame energy and reflection coefficients for the current frame, $R_0$ and $k_i$, with the stored variables $R_0^{stable}$ and $k_i^{stable}$ respectively after quantization. For frames in which speech sounds have not been detected, the values of $R_0^{stable}$ and $k_i^{stable}$ have been updated for the current frame. For frames in which speech sounds have been detected, the values of $R_0^{stable}$ and $k_i^{stable}$ have not been updated for the current frame, i.e. the values of $R_0^{stable}$ and $k_i^{stable}$ are the same as were used for an immediately previous frame.

The processor 110 then executes further stored instructions to modify the LPC-encoded bit stream so as to reduce high frequency components of an audio signal to be synthesized from the LPC-encoded bit stream. In particular, for each frame the processor calculates an impulse response of a filter defined by the LPC coefficients for that frame. The processor applies a low pass filter to the impulse response to calculate a modified impulse response. The processor 110 then applies LPC analysis techniques to calculate modified LPC coefficients from the modified impulse response, and replaces the LPC coefficients for the current frame with the modified LPC coefficients. The processor 110 then calculates the respective frequency responses at zero frequency for the filter defined by the original LPC coefficients for the current frame and for a filter defined by the modified LPC coefficients for the current frame, dividing the frequency response at zero frequency for the original LPC coefficients by the frequency response at zero frequency for the modified LPC coefficients to derive a correction factor. The frame energy for the current frame (one of the excitation parameters) is then multiplied by the correction factor and replaced by the resulting value after quantization.

The embodiment of the invention described above operates directly on an LPC-encoded speech signal to generate LPC-encoded comfort noise. Consequently, this embodiment can be used to generate comfort noise anywhere where the LPC-encoded bit stream is available. It is not necessary to locate the comfort noise generation at the LPC encoder or decoder, nor is it necessary to synthesize the speech signal from the LPC bit stream to generate the comfort noise. Moreover, this embodiment of the invention provides comfort noise which is relatively natural-sounding and consistent with background noise in the speech signal, so as to substantially avoid subjectively annoying characteristics of comfort noise generated by at least some of the known alternative techniques for generating comfort noise.

In the above embodiment, the comfort noise is modelled based on recent frames which are reliably determined to contain noise rather than speech sounds. Frames determined by the speech detector to contain speech are not used to update the output LPC coefficients, $R_0^{stable}$ and $k_i^{stable}$ because these do not accurately describe the background noise. Moreover, frames determined by the speech detector to not contain speech sounds, but for which the energy $R_0$ is lower than the current value of $R_0^{stable}$ determined from previous frames are more likely to contain only background noise than the previous frames. Consequently, LPC coefficients for these frames are used preferentially over the averaged LPC coefficients of the previous frames to model the background noise. The LPC coefficients are averaged over successive frames as this has been determined to provide more natural-sounding comfort noise.

The implementations described above can be modified without departing from the principles of the invention. For example, the specific parameter values exemplified above, and the particular methods used for averaging over time, calculating near end and far end spectra, calculating measures of correlation for the near and far end spectra can be substituted with other parameter values and methods. Indeed, at least some such modifications are likely to be appropriate if the invention is applied to a different LPC coding scheme. The parameters given above are likely to be most appropriate for the VSELP codec specified by the IS-54 standard.

However, with suitable modifications the technique described above could be applied to other CELP-encoded speech signals, for example those using standardized CELP codecs specified for GSM and CDMA wireless systems.

In the comfort noise generation process described above, when the processor 110 determines that the current frame of the LPC-encoded near end signal contains no speech sounds and that the current frame energy is lower than $R_0^{stable}$, the processor 110 may execute stored instructions which compute a shorter term averages of the frame energy $R_0$ and the reflection coefficients $k_i$ than those calculated over 18 frames. For example, the shorter term averages could be calculated over 5 frames. The shorter term averages could then be copied to the variables, $R_0^{stable}$ and $k_i^{stable}$.

Alternatively, the averages could be exponential rather than arithmetic averages, and the short term averages could be calculated using a larger weighting factor for the current frame than is used for calculating the longer term averages.

These and other variations are within the scope of the invention as defined in the claims below.

We claim:

1. A method for suppressing echo of a far end signal encoded using LPC-based compression in a near end signal encoded using LPC-based compression, the method comprising:

processing parameters of each frame of the near end encoded signal without synthesizing a speech signal from said near end encoded signal to determine whether sufficient echo to merit echo suppression is present in said frame;

upon determining that insufficient echo to merit echo suppression is present in said frame, passing the parameters of said frame unmodified; and upon determining that sufficient echo to merit echo suppression is present in said frame, modifying the parameters of said frame without synthesizing a speech signal to suppress echo in said frame.

2. A method as defined in claim 1, wherein the step of processing the parameters of each frame without synthesizing a speech signal from said near end encoded signal to determine whether sufficient echo to merit echo suppression is present in said frame comprises:

determining a near end spectrum from the parameters of said frame of the near end encoded signal;

determining a respective measure of correlation of the near end spectrum to each of a plurality of far end spectra, each far end spectrum corresponding to a respective frame of the far end signal, the respective frame of the far end signal having a respective time lag with respect to said frame of the near end encoded signal;

comparing the measures of correlation to determine a maximum measure of correlation; and declaring sufficient echo to merit echo suppression to be detected in said frame of the near end encoded signal when the maximum measure of correlation exceeds a predefined value.

3. A method as defined in claim 2, wherein each step of determining a respective measure of correlation of the near end spectrum to the far end spectrum comprises determining a cross-covariance of the near end spectrum to the far end spectrum for each of a plurality of frequency bands.

4. A method as defined in claim 3, wherein each step of determining a respective measure of correlation of a near end spectrum to a far end spectrum comprises averaging the cross-covariances.

5. A method as defined in claim 3, wherein each step of determining a cross-covariance of a near end spectrum to a far end spectrum comprises calculating moving window averages of the near end spectrum and the far end spectrum.

6. A method as defined in claim 1, wherein the step of modifying the parameters of said frame without synthesizing a speech signal to suppress echo in said frame comprises modifying said parameters to replace said frame with a frame of encoded noise generated from said parameters.

7. A method as defined in claim 6, wherein the step of modifying said parameters to replace said frame with a frame of LPC-encoded noise generated from said parameters comprises:
   replacing LPC coefficients of said frame with respective averages of the LPC coefficients over a plurality of preceding frames;
   detecting whether speech is present in said frame; and
   upon detection of speech in said frame, randomizing excitation parameters of said frame.

8. A method as defined in claim 7, further comprising processing the modified parameters so as to reduce high frequency components of an audio signal to be synthesized from the processed parameters.

9. A method as defined in claim 8, wherein the step of processing the modified parameters so as to reduce high frequency components of an audio signal to be synthesized from the processed parameters comprises applying a correction factor to a frame energy, the correction factor comprising a frequency response at zero frequency of a filter defined by the modified LPC coefficients before said processing divided by a frequency response at zero frequency of a filter defined by LPC coefficients resulting from said processing.

10. A method as defined in claim 7, wherein the step of replacing LPC coefficients comprises:
   for frames in which no speech is detected, replacing LPC coefficients for said frame with respective averages calculated over the said frame and a plurality of preceding frames; and
   for frames in which speech is detected, replacing LPC coefficients for said frame with respective averages of LPC coefficients used to replace LPC coefficients of an immediately previous frame and randomizing excitation parameters for said frame.

11. A method as defined in claim 10, wherein the step of randomizing excitation parameters comprises randomizing lag values of said frame.

12. Apparatus for suppressing echo of a far end signal encoded using LPC-based compression in a near end signal encoded using LPC-based compression, the apparatus comprising a processor and a storage medium for storing instructions for execution by the processor, the instructions comprising:
   instructions for processing parameters of each frame of the near end encoded signal without synthesizing a speech signal from said near end encoded signal to determine whether sufficient echo to merit echo suppression is present in said frame;
   instructions for passing the parameters of said frame unmodified upon determining that insufficient echo to merit echo suppression is present in said frame; and
   instructions for modifying the parameters of said frame without synthesizing a speech signal to suppress echo in said frame upon determining that sufficient echo to merit echo suppression is present in said frame.

13. Apparatus as defined in claim 12, wherein the instructions for processing the parameters of each frame without synthesizing a speech signal from said near end encoded signal to determine whether sufficient echo to merit echo suppression is present in said frame comprise:
   instructions for determining a near end spectrum from the parameters of said frame of the near end encoded signal;
   instructions for determining a respective measure of correlation of the near end spectrum to each of a plurality of far end spectra, each far end spectrum corresponding to a respective frame of the far end signal, the respective frame of the far end signal having a respective time lag with respect said frame of the near end encoded signal; and
   instructions for comparing the measures of correlation to determine a maximum measure of correlation.

14. Apparatus as defined in claim 12, wherein the instructions for modifying the parameters of said frame without synthesizing a speech signal to suppress echo in said frame comprise instructions for modifying said parameters to replace said frame with a frame of encoded noise generated from said parameters.

15. Apparatus as defined in claim 14, wherein the instructions for modifying said parameters to replace said frame with a frame of encoded noise generated from said parameters comprise:
   instructions for replacing LPC coefficients of said frame with respective averages of the LPC coefficients over a plurality of preceding frames;
   instructions for detecting whether speech is present in said frame; and
   instructions for randomizing excitation parameters of said frame upon detection of speech in said frame.

16. Apparatus as defined in claim 15, wherein the instructions for replacing LPC coefficients comprise:
   instructions for replacing LPC coefficients for said frame with respective averages calculated over the said frame and a plurality of preceding frames for frames in which no speech is detected; and
   replacing LPC coefficients for the said frame with respective averages of LPC coefficients used to replace LPC coefficients of an immediately previous frame for frames in which speech is detected.

17. A storage medium storing processor-readable instructions for execution by a processor to suppress echo of a far end signal encoded using LPC-based compression in a near end signal encoded using LPC-based compression, the instructions comprising:
   instructions for processing parameters of each frame of the near end encoded signal without synthesizing a speech signal from said near end encoded signal to determine whether sufficient echo to merit echo suppression is present in said frame;
   instructions for passing the parameters of said frame unmodified upon determining that insufficient echo to merit echo suppression is present in said frame; and
   instructions for modifying the parameters of said frame without synthesizing a speech signal to suppress echo in said frame upon determining that sufficient echo to merit echo suppression is present in said frame.

18. A storage medium as defined in claim 17, wherein the instructions for processing the parameters of each frame without synthesizing a speech signal from said near end encoded signal to determine whether sufficient echo to merit echo suppression is present in said frame comprise:
- instructions for determining a near end spectrum from the parameters of said frame of the near end encoded signal;
- instructions for determining a respective measure of correlation of the near end spectrum to each of a plurality of far end spectra, each far end spectrum corresponding to a respective frame of the far end signal, the respective frame of the far end signal having a respective time lag with respect said frame of the near end encoded signal; and
- instructions for comparing the measures of correlation to determine a maximum measure of correlation.

19. A storage medium as defined in claim 17, wherein the instructions for modifying the parameters of said frame without synthesizing a speech signal to suppress echo in said frame comprise instructions for modifying said parameters to replace said frame with a frame of encoded noise generated from said parameters.

20. A storage medium as defined in claim 19, wherein the instructions for modifying said parameters to replace said frame with a frame of encoded noise generated from said parameters comprise:
- instructions for replacing LPC coefficients of said frame with respective averages of the LPC coefficients over a plurality of preceding frames;
- instructions for detecting whether speech is present in said frame; and
- instructions for randomizing excitation parameters of said frame upon detection of speech in said frame.

21. Apparatus as defined in claim 20, wherein the instructions for replacing LPC coefficients comprise:
- instructions for replacing LPC coefficients for said frame with respective averages calculated over the said frame and a plurality of preceding frames for frames in which no speech is detected; and
- replacing LPC coefficients for the said frame with respective averages of LPC coefficients used to replace LPC coefficients of an immediately previous frame for frames in which speech is detected.

* * * * *